(12) United States Patent
Merrick et al.

(10) Patent No.: US 11,801,563 B2
(45) Date of Patent: Oct. 31, 2023

(54) TOOL HAVING MOVABLE JAWS FOR ENGAGING EACH DRIVE FLANK OF A NUT

(71) Applicant: ToolTech, LLC, Phoenix, AZ (US)

(72) Inventors: Jake Merrick, Hinton, OK (US);
Lucas Taylor, Williamsport, PA (US);
Christopher Aho, Philadelpha, PA (US)

(73) Assignee: ToolTech, LLC, Phoenix, AZ (US)

( * ) Notice: Subject to any disclaimer, the term of this patent is extended or adjusted under 35 U.S.C. 154(b) by 275 days.

(21) Appl. No.: 17/406,955

(22) Filed: Aug. 19, 2021

(65) Prior Publication Data
US 2022/0063003 A1 Mar. 3, 2022

Related U.S. Application Data

(60) Provisional application No. 63/073,330, filed on Sep. 1, 2020.

(51) Int. Cl.
*B23B 31/171* (2006.01)
*B25B 13/44* (2006.01)

(52) U.S. Cl.
CPC .......... *B23B 31/1612* (2013.01); *B25B 13/44* (2013.01)

(58) Field of Classification Search
CPC .......................... B25B 13/44; B23B 31/1612
See application file for complete search history.

(56) References Cited

U.S. PATENT DOCUMENTS

| | | | | |
|---|---|---|---|---|
| 2,742,297 | A * | 4/1956 | Bilz | B23B 31/1612 |
| | | | | 279/66 |
| 7,793,569 | B2 * | 9/2010 | Nash | B23G 1/265 |
| | | | | 81/63.1 |
| 8,955,414 | B2 * | 2/2015 | Merrick | B25B 13/50 |
| | | | | 81/53.2 |
| 9,132,531 | B2 | 9/2015 | Merrick | |
| 9,278,434 | B2 | 3/2016 | Merrick | |
| 9,662,775 | B2 | 5/2017 | Merrick | |
| 9,868,188 | B2 | 1/2018 | Merrick | |
| 2007/0243753 | A1 * | 10/2007 | Huang | B25B 13/44 |
| | | | | 439/453 |
| 2017/0334043 | A1 * | 11/2017 | Carnesi | B25B 13/44 |
| 2018/0229348 | A1 * | 8/2018 | Womack | B25B 13/18 |

* cited by examiner

*Primary Examiner* — David B. Thomas
(74) *Attorney, Agent, or Firm* — BRACEWELL LLP; Keith R. Derrington (57) ABSTRACT

A tool for engaging drive flanks of a threaded nut has a tool body with a central cavity. Cam surfaces are formed in an inner wall of the central cavity. A retainer secured within the central cavity has an outward-facing slot. A jaw for each of the cam surfaces has a curved outer side in contact with one of the cam surfaces and a drive surface on an inner side for engaging one of the drive flanks of the nut. A foot extends inward from a lower end of each of the jaws into the slot to retain the jaws within the central cavity. Rotating the tool body relative to the jaws moves the drive surfaces of the jaws from a retracted position to a gripping position in engagement with the drive flanks of the nut.

20 Claims, 8 Drawing Sheets

TOOL HAVING MOVABLE JAWS FOR ENGAGING EACH DRIVE FLANK OF A NUT

CROSS-REFERENCE TO RELATED APPLICATION

This application claims priority to provisional application Ser. No. 63/073,330, filed Sep. 1, 2020.

FIELD OF THE DISCLOSURE

This disclosure relates in general to tools for unscrewing and tightening threaded nuts, and in particular to a tool having jaws carried within a tool body, one for each drive flank of a nut, the tool body having cam surfaces that advance and retract each of the jaws into engagement with one of the drive flanks of the nut.

BACKGROUND

Threaded nuts are used for many fastener purposes. One type of nut, known as a lug nut, is employed to fasten wheels to vehicles. Normally, each lug nut has six drive flanks arranged in a hexagonal pattern. Many lug nuts are capped or clad with a metal to provide a chromium appearance. The wrench or tool to tighten and loosen lug nuts typically has a socket body with fixed jaws, one that engages each corner between drive flanks. Damage tends to occur at the corners of the drive flanks, particularly with metal clad lug nuts.

Also, some lug nuts will have metric dimensions while others are dimensioned in fractions of inches, known as English tools. A metric tool with fixed jaws is used with metric lug nuts. An English tool manufactured with fixed jaws in fractions of inches is used with nuts manufactured in fractions of inches.

U.S. Pat. Nos. 8,955,414 and 9,138,873 disclose nut removal and tightening tools with jaws that are moved into engagement with a nut by rotation of the tool body. While workable, improvements are desired not only for tools for lug nuts, but also other types of nuts.

SUMMARY

A tool for engaging drive flanks of a threaded nut comprises a tool body having a central cavity with a longitudinal axis and an open end. A plurality of cam surfaces formed in an inner wall of the central cavity extend around the axis in the central cavity. A retainer secured within the central cavity has an outward-facing slot. A jaw for each of the cam surfaces has a curved outer side in contact with one of the cam surfaces. Each of the jaws has on an inner side a drive surface for engaging one of the drive flanks of the nut. A foot extends inward from a recessed end of each of the jaws toward the axis and into the slot to retain the jaws within the central cavity. Rotating the tool body relative to the jaws moves the drive surfaces of the jaws from a retracted position to a gripping position in engagement with the drive flanks of the nut.

In the embodiment shown, each foot has an inner end that is partly circular when viewed in a cross-sectional plane perpendicular to the axis. While moving from the retracted to the gripping position, each jaw rotates an increment about the foot center point. Each foot center point remains fixed relative to the tool body while moving from the retracted position to the gripping positions.

Each of the cam surfaces is curved with a radius extending from a single cam surface center point. Each of the foot center points is on a line extending through one of the cam surface center points that is parallel with the axis.

In the example shown, a central bore extends from the central cavity in a direction away from the open end. The retainer has a retainer body rigidly secured within the central bore. The central bore has a diameter less than a diametrical dimension of the central cavity. The retainer has a head connected to the retainer body by a neck of smaller diameter than the retainer body and the head. The neck and the head are within the central cavity. The slot is defined on an inner side by the neck and by opposing surfaces of the retainer body and the head.

In the embodiment shown, when viewed in a cross-sectional plane through the feet perpendicular to the axis, each foot comprises two side edges extending from the outer side of each of the jaws inward toward the axis and converging toward each other. The inner end of the foot joins the side edges and is partly circular and convex. A recess on each side edge between the inner end of the foot and the outer side of the jaw receives the inner end of an adjacent one of the feet when the jaws are in a gripping position.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. The terms "upper", "lower" and the like are used only for convenience as the tool may be operated in variety of positions.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
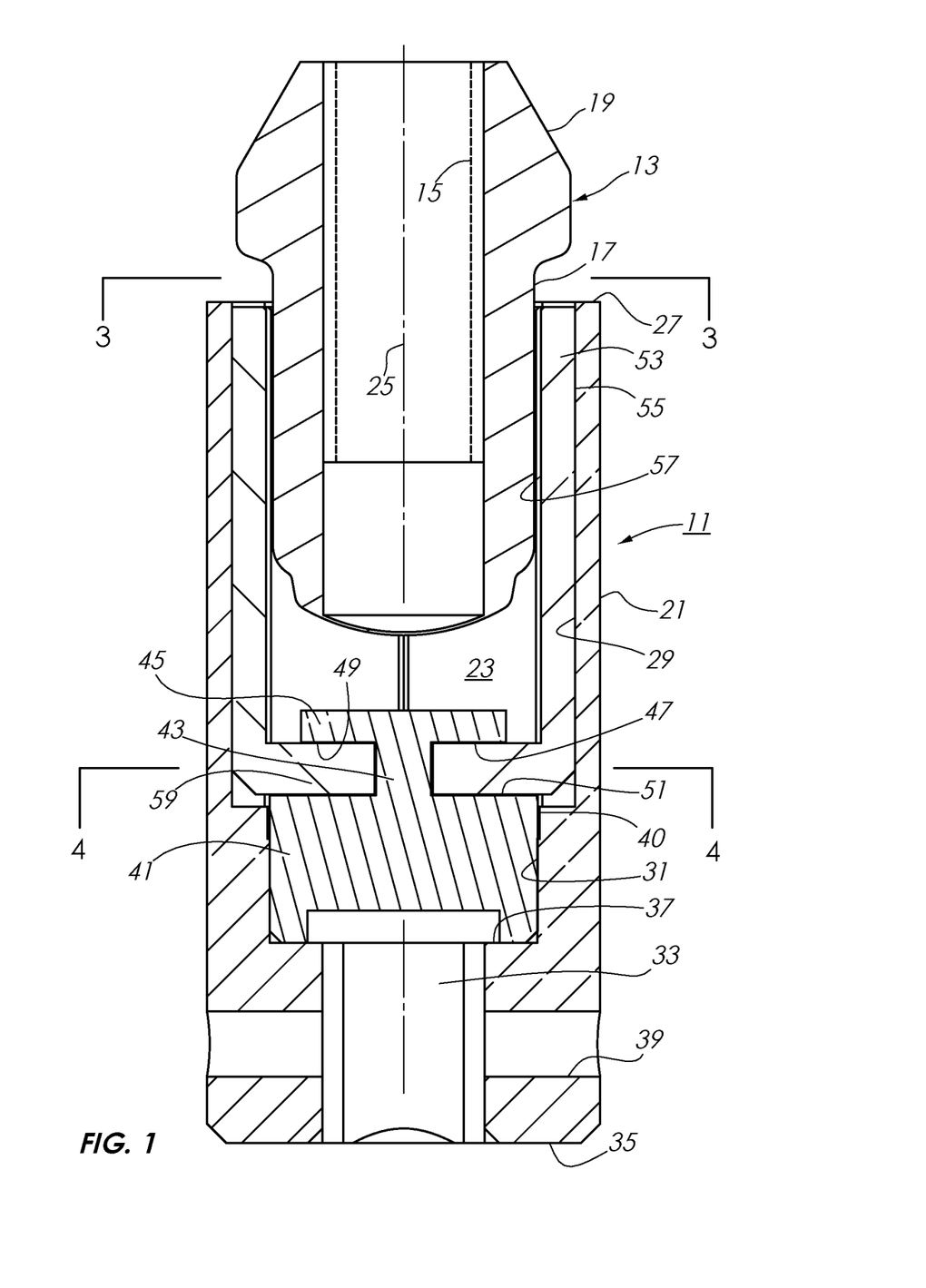
FIG. 1 is an axial sectional view of one end of a nut tool in accordance with this—disclosure shown in engagement with a lug nut.

FIG. 1 illustrates tool 11 in engagement with a nut 13 for subsequent tightening or loosening. In this example, nut 13 is a lug nut used to secure wheels of a vehicle. However, tool 11 is feasible for many other types of nuts. Nut 13 has a threaded bore 15 that engages a threaded stud (not shown) protruding from a brake assembly of a vehicle. Nut 13 has drive flats or flanks 17, normally six, providing a hexagonal configuration. Tool 11 may be configured for use with nuts having a different number of drive flanks, such as four. In this example, nut 13 has an enlarged conical base 19 on one end that engages a receptacle of a wheel rim. Although FIG. 1 illustrates the end of threaded bore 15 opposite base 19 to be open, often it would have a cap.

Tool 11 has a tool body 21 that has a central cavity 23 with a longitudinal axis 25. The exterior of tool body 21 may be cylindrical. Tool body 21 has an open end 27, which is referred to for convenience only as the upper end. In use, tool 11 would normally be horizontal and open end 27 would not be at an upper end of tool 11. Cavity 23 extends downward from open end 27, allowing the insertion of nut 13. Cavity 23 has curved cam surfaces 29 extending around its inner wall, one for each nut drive flank 17.

Tool body 21 has a cylindrical central bore 31 that extends downward from a lower end of cavity 23. Bore 31 is coaxial with axis 25 and may have a smaller outer diameter than the diametrical dimensions of cavity 23. A drive socket 33 extends upward from the lower end 35 of tool body 21 to central bore lower end 37. Drive socket 33 has a square interior in this example to receive a variety of drive members of common tools for rotating tool body 21, such as impact wrenches, breaker bars, and torque wrenches. In addition, tool body 21 may have spanner holes 39 that are perpendicular to axis 25 and extend inward from the exterior of tool body 21 to drive socket 33. Spanner holes 39 may be engaged by a bar or a spanner tool for rotating tool body 21 rather than using drive socket 33.

A jaw retainer 40 secures within central bore 31 so as to be non-rotatable and axially fixed relative to tool body 21. In this example, retainer 40 has a cylindrical retainer body 41 that is pressed into an interference fit with central bore 31. Optionally, the exterior of retainer body 41 could have one or more axially extending splines that engage mating grooves in central bore 31 to add further resistance to rotation of retainer 40 relative to tool body 21. Other ways to secure retainer 40 in central cavity 23 to prevent axial and rotational movement relative to tool body 21 are feasible.

In this embodiment, retainer 40 has a neck 43 protruding upward from retainer body 41 and central bore 31 into central cavity 23. Neck 43 has a head 45 formed on its upper end. Axis 25 extends coaxially through neck 43 and head 45. Neck 43 may be cylindrical with a smaller outer diameter than retainer body 41. Head 45 may also have a cylindrical exterior, and in this example, the outer diameter of head 45 is greater than neck 43 and less than retainer body 41. Retainer body 41, neck 43 and head 45 may be integrally formed with each other from a single monolithic metal.

Retainer 40 has an annular slot 47 extending around neck 43 coaxial with axis 25. Head 45 has a flat lower side or retainer surface 49 that faces and is spaced above a flat upper side or retaining surface 51 of retainer body 41, defining slot 47. Upper and lower surfaces 49, 51 are in planes perpendicular to axis 25. Slot 47 is located at or slightly above the lower end of central cavity 23 in this example.

Central cavity 23 holds a plurality of jaws 53, one for each cam surface 29. Each jaw 53 has a curved convex outer side 55 that is in flush engagement with one of the cam surfaces 29 while tool 11 is in a retracted position. Each jaw 53 has a flat drive surface 57 on an inner side for flush contact with one of the nut drive flanks 17 while in a gripping position.

Figure 2:
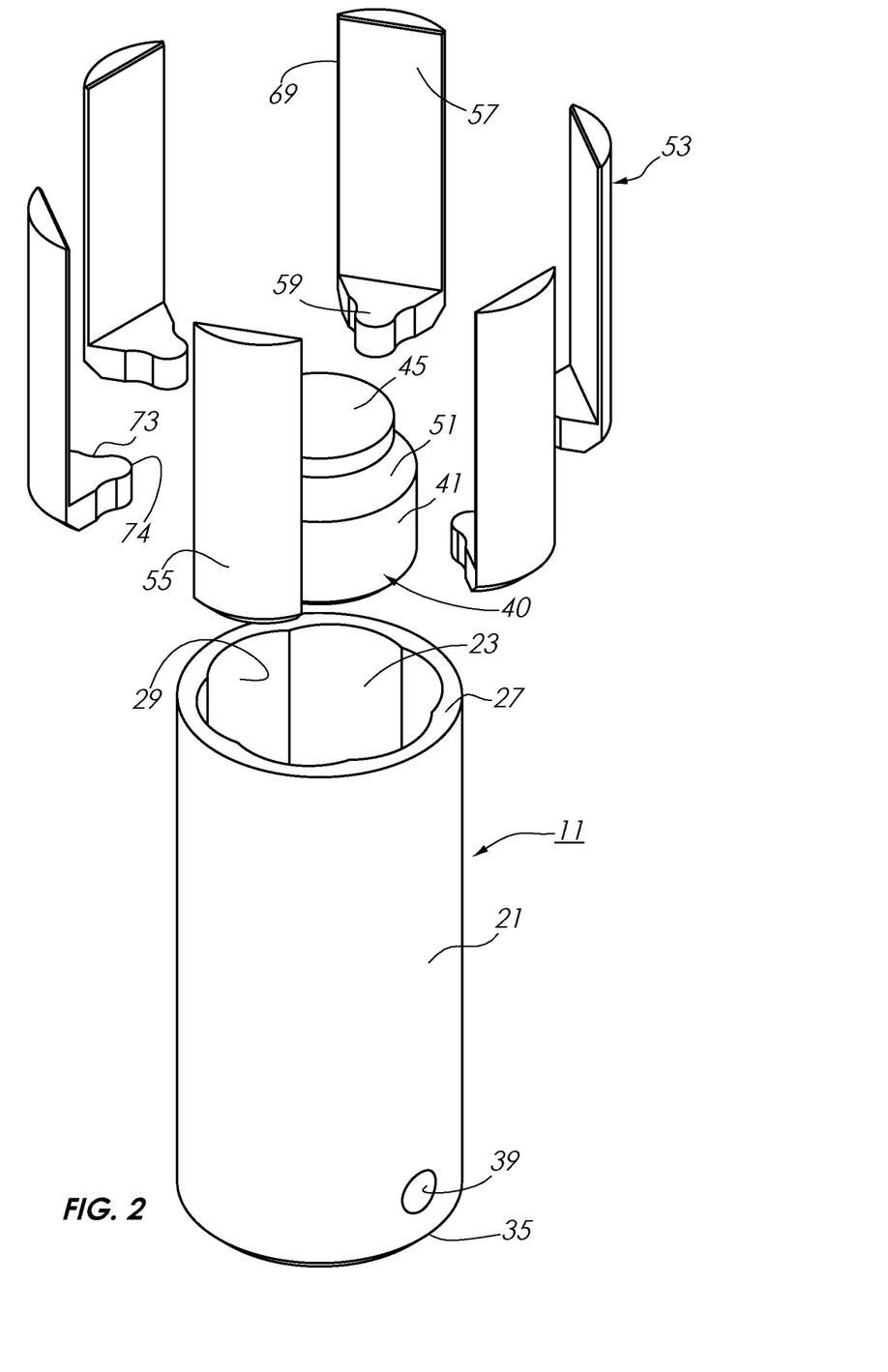
FIG. 2 is an isometric view of the tool of FIG. 1, but with the jaws and jaws retainer removed and exploded.

Each jaw 53 extends downward in central cavity 23 and has an inward protruding foot 59 at its lower end, as shown also in FIG. 2. Each foot 59 of each jaw 53 is near the lower end of central cavity 23 and extends radially inward into slot 47, retaining jaws 53 in central cavity 23. Each foot 59 has a flat upper side that is in sliding engagement with head downward facing surface 49 and a flat lower side in sliding engagement with retainer body upward facing surface 51. The inner end of each foot 59 is closely spaced to or touching neck 43. Feet 59 also prevent jaws 53 from tilting inward relative to cam surfaces 29 while a nut 13 is not in in central cavity 23. The radial length of each foot 59 is much less than the axial length of each jaw 53. Each foot 59 may be integrally joined to one of the jaws 53.

During assembly of tool 11, feet 59 will be positioned in slot 47 prior to installing retainer 40 in central bore 31. Then the assembly of jaws 59 and retainer 40 will be lowered into central cavity 23, with each jaw outer side 55 aligned with one of the cam surfaces 29. After retainer body 41 is in contact and aligned with the upper end of central bore 31, a technician will insert a tool, such as a tube (not shown) around retainer body head 45 and in engagement with the upper sides of jaw feet 59. The technician applies a downward force sufficient to press retainer body 40 into central bore 31. When retainer body 41 abuts central bore bottom 37, the upper ends of jaws 53 will be flush with open upper end 27.

Figure 3:
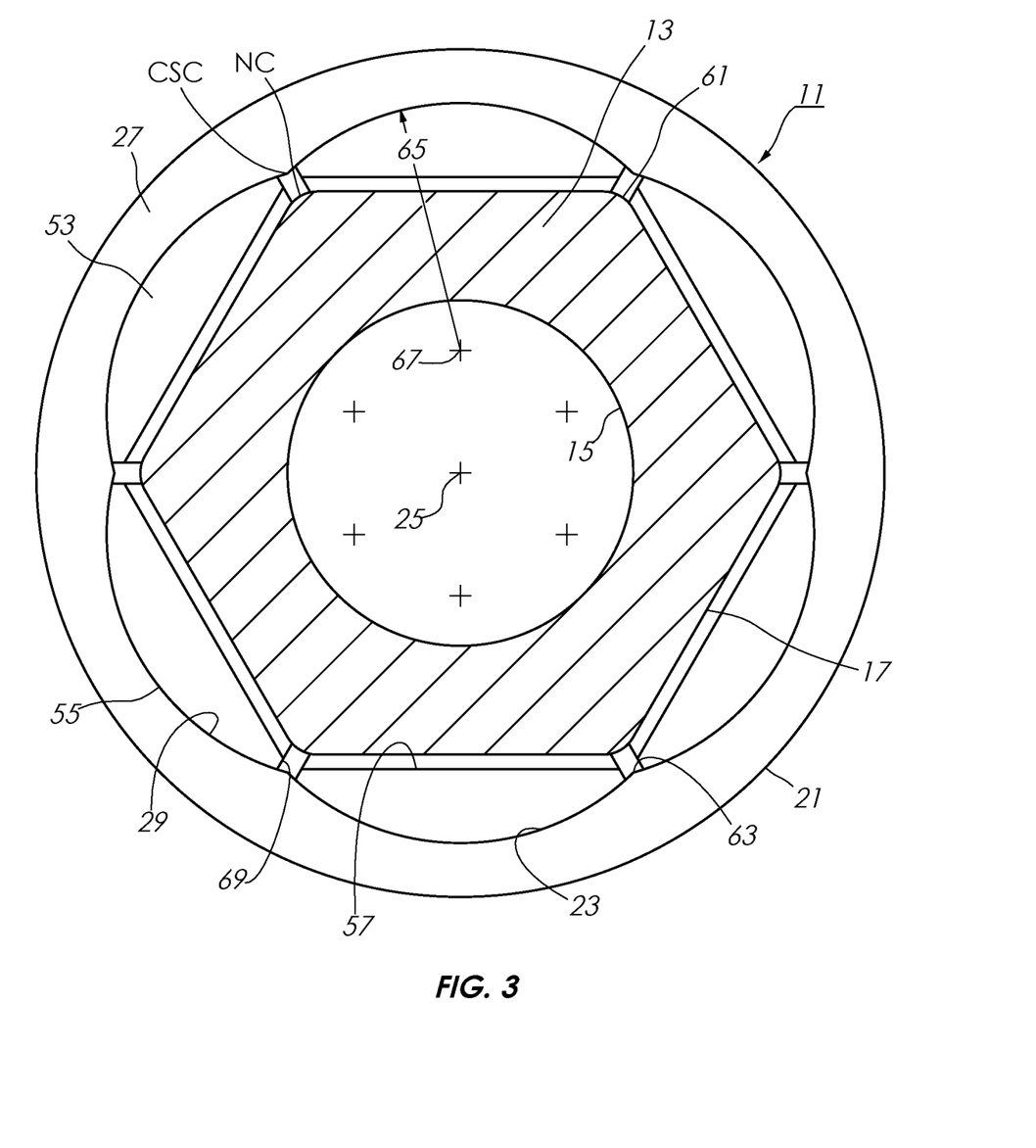
FIG. 3 is a transverse sectional view of the tool and lug nut shown in FIG. 1, taken along the line 3-3 of FIG. 1 and showing the jaws in a retracted position.

FIG. 3 illustrates tool 11 in a neutral or retracted position relative to nut 13. In this embodiment, nut 13 has six nut corners 61, each joining one drive flank 17 to an adjacent drive flank 17. Tool body 21 has six cam surface corners 63, each joining one cam surface 29 to an adjacent cam surface 29. While in the retracted position, each nut corner 61 and cam surface corner 63 is located on a same radial line from axis 25. Each cam surface corner 63 is spaced a short distance radially outward from one of the nut corners 61. While in the retracted position, each jaw drive surface 57 is parallel to and spaced a short distance radially outward from one of the nut drive flanks 17.

In this example, each cam surface 29 has a single radius 65 extending from a single center point 67. Each cam surface center point 67 is spaced halfway between cam surface corners 63 of one of the cam surfaces 29. Each cam surface center point 67 is spaced radially outward from axis 25.

The outer side 55 of each jaw 53 has the same radius as cam surface radius 65. While in the retracted position, the center point for the radius of each jaw outer side 55 will coincide with cam surface center point 67. Each jaw 53 has a side edge 69 that is near one of the nut corners 63 while tool 11 is in the retracted position. In this example, the width of each jaw 53 between side edges 69 is slightly less than the width of each nut drive flank 17 between nut corners 61. A small gap exists between adjacent side edges 69 while in the retracted position.

The arcuate dimension of each jaw outer side 55 from side edge 69 to side edge 69 in this example is slightly less than the arcuate dimension from one cam surface corner 63 to the next. While in the retracted position, the entire curved outer side 55 of each jaw 53 is in flush contact with one of the cam surfaces 29.

Figure 4:
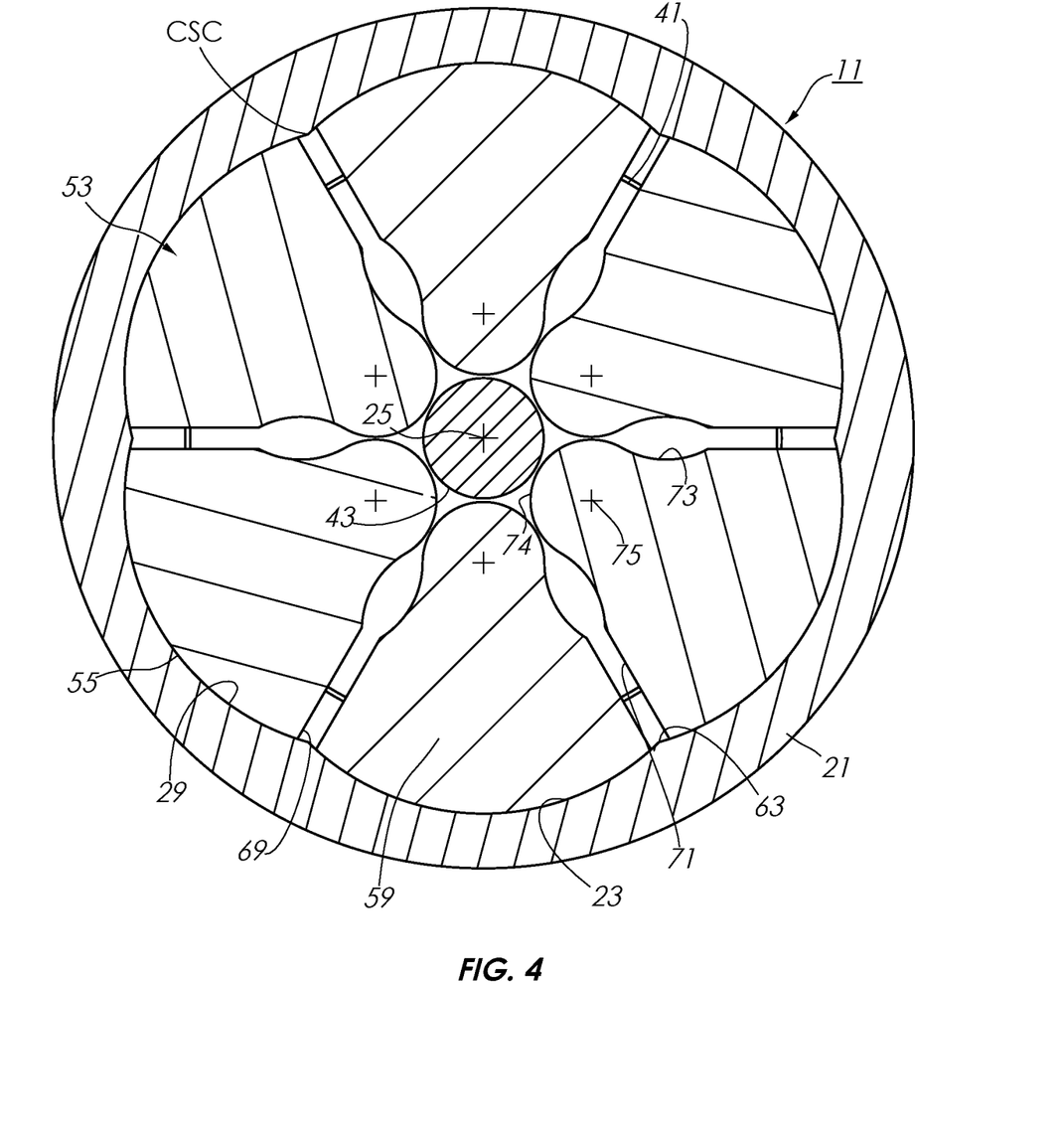
FIG. 4 is a transverse sectional view of the tool of FIG. 1, taken along the line 4-4 of FIG. 1 and showing feet of the jaws in the retracted position.

FIG. 4 illustrates feet 59 while tool 11 is in the retracted position. Each foot 59 has foot side edges 71 that extend inward and converge from jaw side edges 69 at the same angle. Each foot side edge 71 has a curved side recess 73, which in turn joins a partly convex circular portion or inner end, which may be considered to be a single toe 74 of each foot 59. Toe 74 has a radius formed about a foot center point 75 and extends circumferentially about 180 degrees. Each recess 73 may have a single radius. While in the retracted position, foot side edges 71 are on approximately radial lines of axis 25 and spaced from side edges 71 of adjacent feet 59 by a gap. The inner edge of each toe 74 may touch or be closely spaced to retainer body neck 43. Side portions of each toe 74 may touch or be closely spaced to side portions of toes 74 of adjacent feet 59 while in the retracted position. Toe center points 75 are at the same position relative to cam surfaces 29 as cam surface center points 67 (FIG. 3) while in the retracted position. That is, a line extending between one cam surface center point 67 to the toe center point 75 of the same jaw 53 would be parallel to axis 25.

During operation and referring again to FIG. 3, a worker will slide tool 11 over nut 13 while jaws 53 are in the retracted position. This insertion places each jaw 53 in alignment with one of the nut drive flanks 17. For purposes of discussion, the uppermost cam surface corner 63 illustrated in FIG. 3 is designated CSC, and the uppermost nut corner 61 in FIG. 3 is designated NC. A radial line from axis 25 passes through cam surface corner CSC and nut corner NC.

Figure 5:
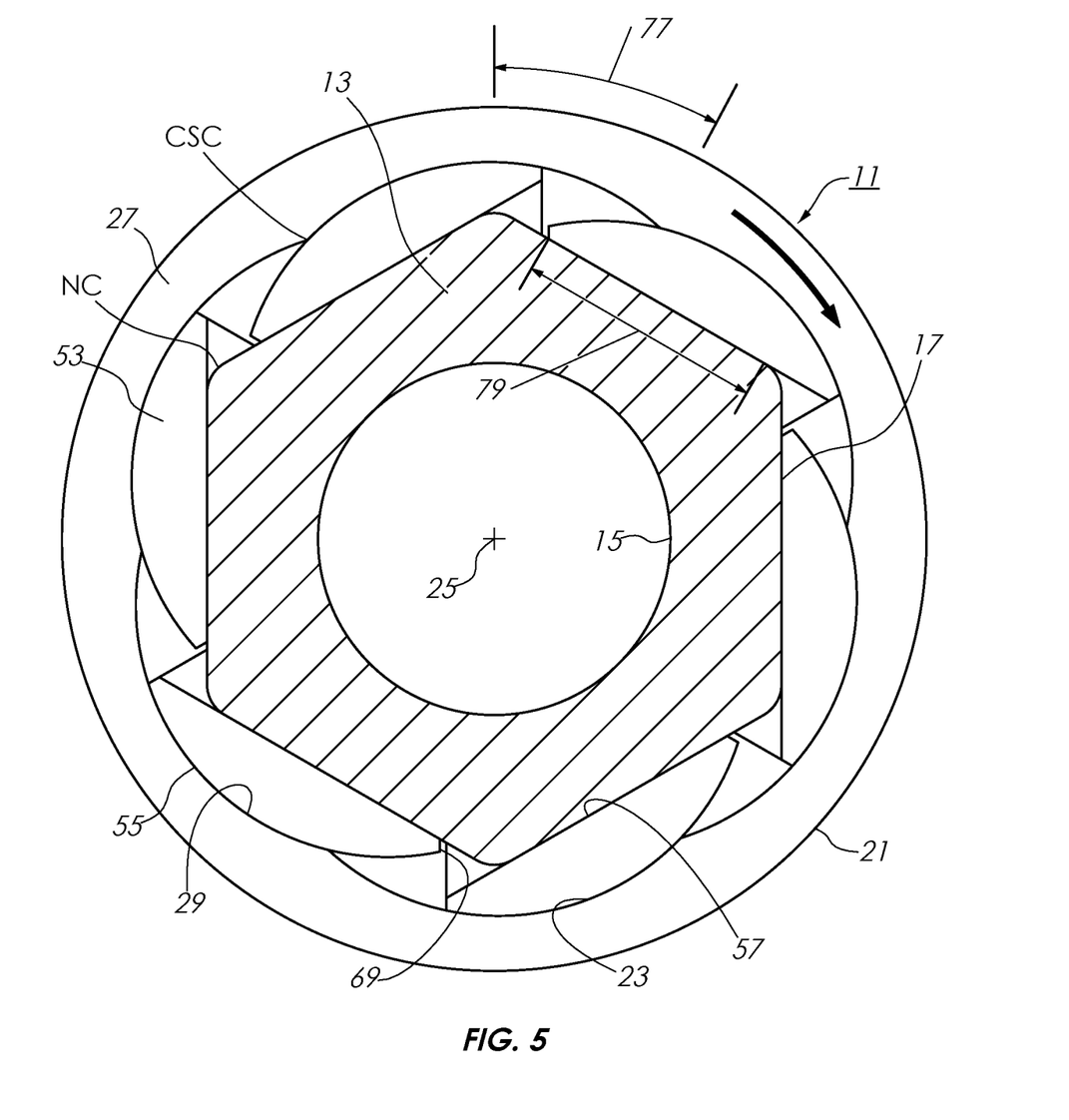
FIG. 5 is a transverse sectional view similar to FIG. 3, but showing the jaws in a gripping position for loosening the lug nut.

Tool 11 has two gripping positions, one for unscrewing nut 13 and one for tightening nut 13. FIG. 5 illustrates tool body 21 rotated in a direction indicated by the arrow, but before any rotation of nut 13 occurs. If observed from tool body lower end 35 (FIG. 1), this rotation would be counter clockwise, normally for unscrewing nut 13. This rotation is made by engaging a tool with drive socket 33 (FIG. 1) or spanner holes 39.

FIG. 5 shows that the rotation has caused cam surfaces 29 to push jaws 53 radially inward such that a portion of each jaw drive surface 57 is in flush contact with one of the nut drive flanks 17. Cam surface corner CSC moves rotationally relative to nut 13 for an angle 77 from its retracted position in FIG. 3. Cam surfaces 29 move rotationally relative to jaw outer sides 55. Also, each cam surface 29 moves rotationally relative to each jaw 53, resulting in a portion of each cam surface 29 sliding out of engagement with its jaw outer side 55. A larger portion of each jaw outer side 55 will still be in flush contact with one of the cam surfaces 29 in the gripping position of FIG. 5.

Also, each jaw 53 moves rotationally relative to nut 13 while tool outer body 21 rotates from the retracted position to one of the gripping positions. The amount of rotation of each jaw 53 relative to nut 13 is less than tool body 21 rotation illustrated by angle 77. The rotation of jaws 53 relative to nut 13 results in a portion of each jaw 53 being out of engagement with its nut drive flank 17 while in the gripping position of FIG. 5. Each side edge 69 of each jaw 53 will have advanced rotationally relative to one of the nut corners 61 of its nut drive flank 17. However, the amount of flush contact 79 of each jaw drive surface 57 with each nut drive flank 17 is considerably greater than half the width of each nut drive flank 17.

The amount of angular movement 77 and the amount of flush contact 79 will depend on tolerances. Also, tool 11 can tighten and loosen nuts 13 of different sizes, that is whether they are manufactured to a metric dimension or an inches dimension. In the example shown, angular distance 77 is about 20 degrees and the amount of flush contact 79 relative to the width of nut drive flank 17 is about 80 percent. Also, in this example each jaw 53 moved rotationally about 10 degrees from the retracted position to one of the gripping positions.

Figure 6:
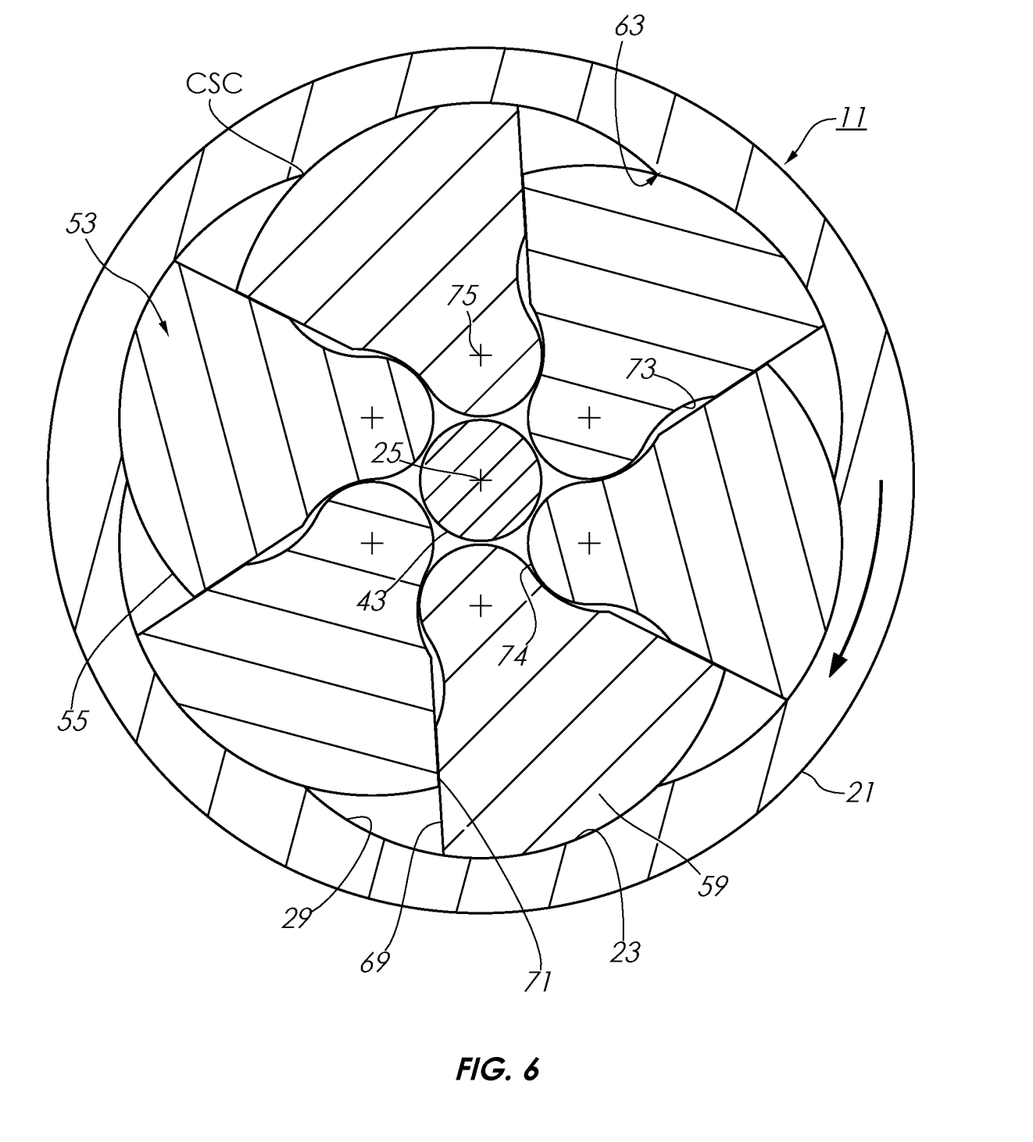
FIG. 6 is a transverse sectional view similar to FIG. 4, but showing the feet of the jaws in a gripping position for loosening the lug nut.

FIG. 6 illustrates the movement of feet 59 when tool body 21 is rotated from the retracted position to the gripping position of FIG. 5. Jaw side edges 69 and feet side edges 71 come closer to each other, and would touch if no nut 13 were present. Side portions of toes 74 partly enter recesses 73 of adjacent feet 59. Toe center points 75, however, remain in the same positions relative to axis 25. The rotational movement of tool body 21 relative to nut 13 does not cause any translational movement of toe center points 75. The rotational movement of tool body 21 relative to nut 13 causes some pivotal rotation of feet 59 about toe center point 75. Continued rotation in the same direction after reaching the gripping position of FIGS. 5 and 6 will not cause any additional relative movement between jaws 53 and tool body 21.

Figure 7:
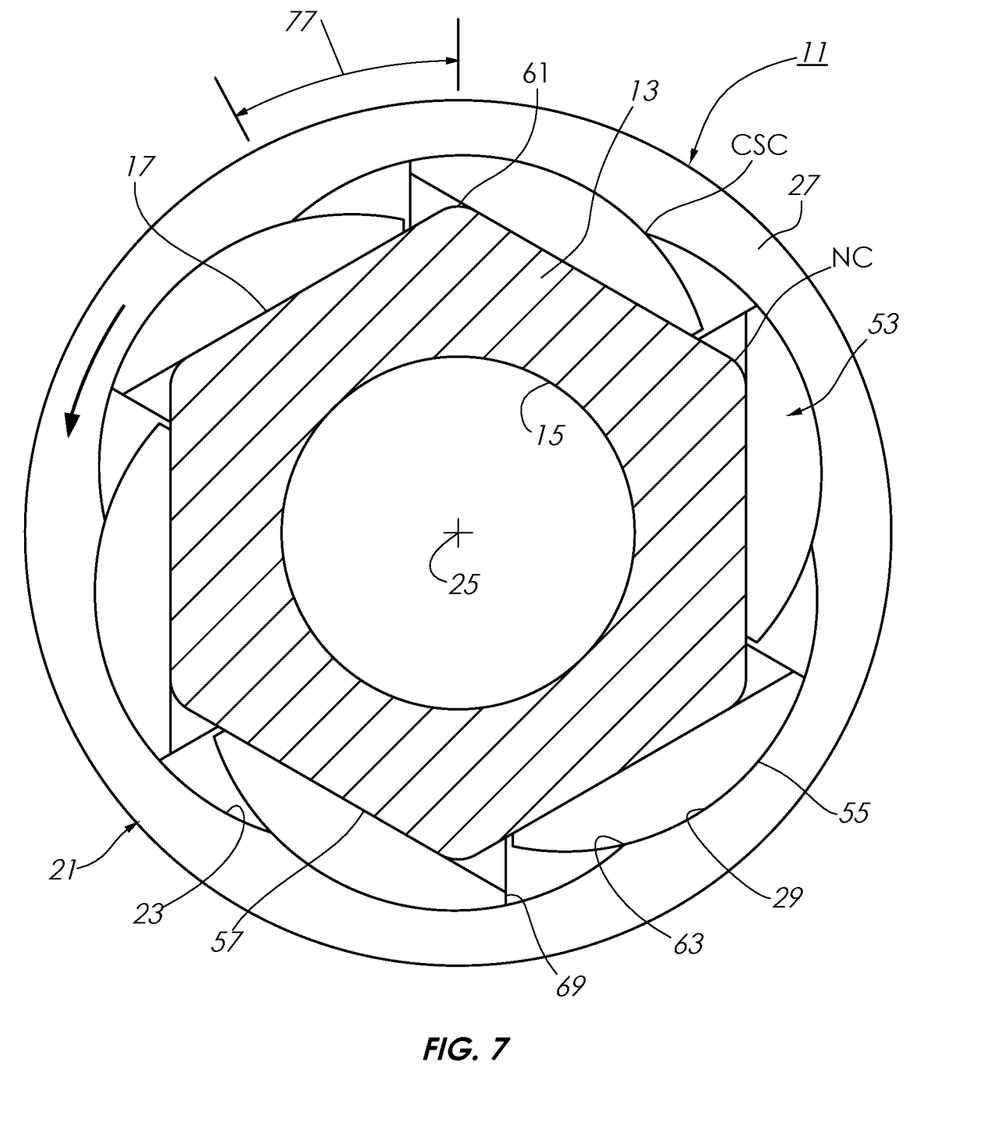
FIG. 7 is a transverse sectional view similar to FIG. 3, but showing the jaws in a gripping position for tightening the lug nut.
Figure 8:
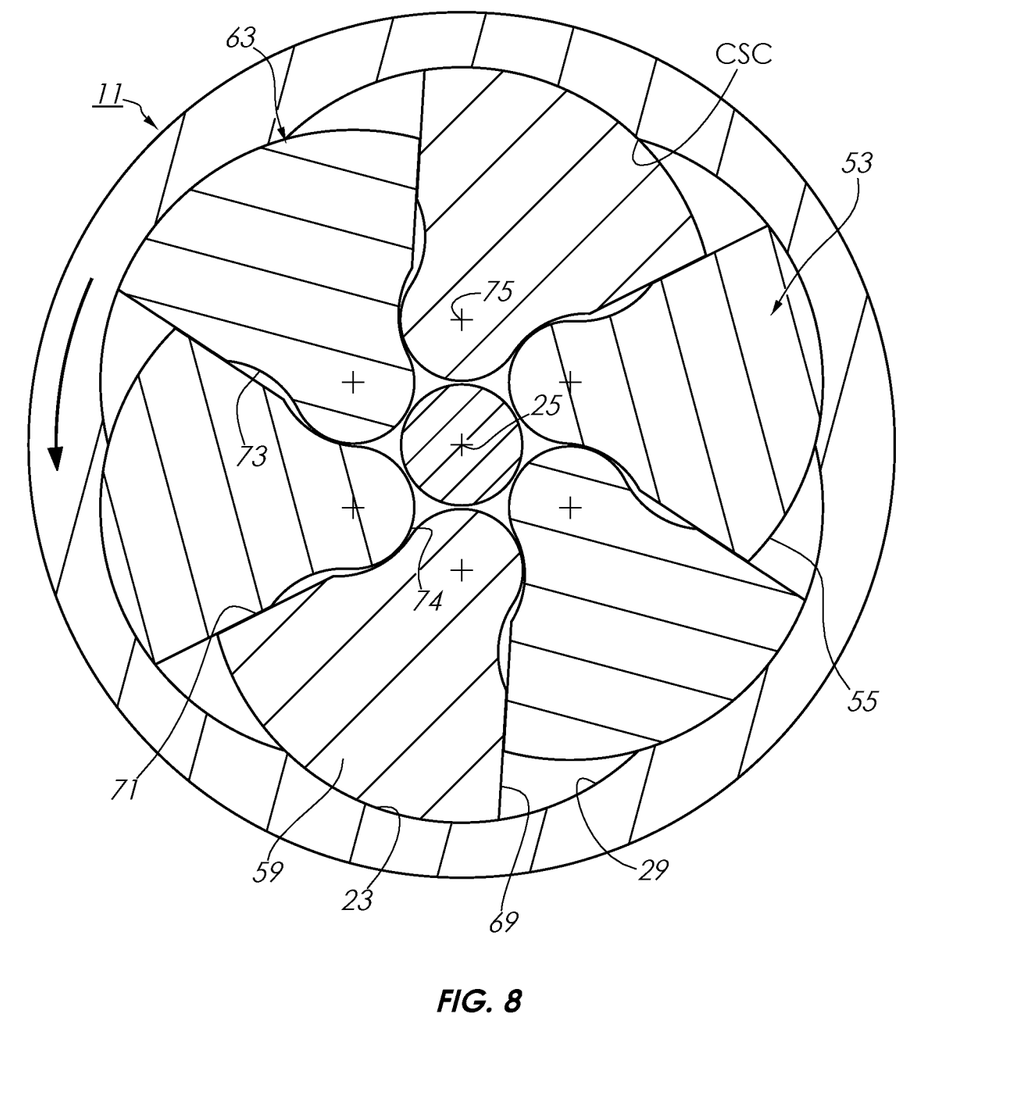
FIG. 8 is a transverse sectional view similar to FIG. 4, but showing the feet of the jaws in a gripping position for tightening the lug nut.

FIGS. 7 and 8 illustrate tool 11 rotated from the retracted position of FIG. 3 in the opposite direction, as indicated by the arrows. The same movement of jaws 53 and feet 59 occurs as in the movement to the gripping position of FIGS. 5 and 6.

The present disclosure described herein, therefore, is well adapted to carry out the objects and attain the ends and advantages mentioned, as well as others inherent therein. The jaws are not attached to each other by elastomeric webs, and they are not retained with each other by springs, reducing complexity. While only one embodiment of the disclosure has been given for purposes of disclosure, numerous changes exist in the details of procedures for accomplishing the desired results. These and other similar modifications will readily suggest themselves to those skilled in the art, and are intended to be encompassed by the scope of the claims.

The invention claimed is:
1. A tool for engaging drive flanks of a threaded nut, comprising:
   a tool body having a central cavity with a longitudinal axis and an open end;
   a plurality of cam surfaces formed in an inner wall of the central cavity and extending around the axis;
   a retainer secured within the central cavity, the retainer having an outward-facing slot;
   a jaw for each of the cam surfaces, each of the jaws having a curved outer side in contact with one of the cam surfaces, each of the jaws having on an inner side a drive surface for engaging one of the drive flanks of the nut;
   a foot extending inward from a recessed end of each of the jaws toward the axis into the slot to retain the jaws within the central cavity; and wherein
   rotating the tool body relative to the jaws moves the drive surfaces of the jaws from a retracted position to a gripping position in engagement with the drive flanks of the nut.

2. The tool according to claim 1, wherein each foot has an inner end that is partly circular when viewed in a cross-sectional plane perpendicular to the axis.

3. The tool according to claim 1, wherein each of the cam surfaces is curved with a radius extending from a single cam surface center point.

4. The tool according to claim 1, wherein:
each foot has an inner end that is curved with a radius extending from a foot center point; and
while moving from the retracted to the gripping position, each jaw rotates an increment about the foot center point.

5. The tool according to claim 4, wherein each foot center point remains fixed relative to the tool body while moving from the retracted position to the gripping positions.

6. The tool according to claim 1, wherein:
each of the cam surfaces is curved with a radius extending from a single cam surface center point;
each foot has an inner end that is curved with a radius extending from a foot center point; and
each of the foot center points is on a line that is parallel with the axis and extends through one of the cam surface center points.

7. The tool according to claim 1, further comprising:
a central bore joining and extending from the central cavity in a direction away from the open end; and wherein:
the retainer has a retainer body rigidly secured within the central bore.

8. The tool according to claim 1, further comprising:
a central bore joining and extending from the central cavity in a direction away from the open end; wherein:
the retainer has a retainer body rigidly secured within the bore;
the retainer has a head connected to the retainer body by a neck of smaller diameter than the retainer body and the head, the neck and the head being within the central cavity; and wherein
the slot is defined by the neck and opposing surfaces of the retainer body and the head.

9. The tool according to claim 1, wherein when viewed in a cross-sectional plane through the feet perpendicular to the axis, each foot comprises:
two side edges extending from the outer side of each of the jaws inward toward the axis and converging toward each other;
an inner end that joins the side edges and is partly circular and convex; and
a recess on each side edge between the inner end of the foot and the outer side of the jaw, the recess receiving part of the inner end of an adjacent one of the feet when the jaws are in a gripping position.

10. A tool for engaging drive flanks of a threaded nut, comprising:
a tool body having a central cavity with a longitudinal axis and an open end;
a plurality of cam surfaces formed in an inner wall of the central cavity and extending around the axis in the central cavity;
a retainer secured within the central cavity, the retainer having an annular slot extending around the axis and outwardly open to the central cavity;
a jaw for each of the cam surfaces, each of the jaws having a first end at the open end of the central cavity and a second end recessed within the central cavity, each of the jaws having a curved outer side extending between the first and second ends in flush contact with one of the cam surfaces, each of the jaws having on an inner side a drive surface extending between the first and second ends for engaging one of the drive flanks of the nut;
a foot extending inward from the second end of each jaw into the slot, retaining each of the jaws with the retainer; and wherein
rotating the tool body relative to the jaws moves the drive surfaces of the jaws from a retracted position to a gripping position in engagement with the drive flanks of the nut.

11. The tool according to claim 10, wherein each of the cam surfaces is curved with a radius extending from a single cam surface center point.

12. The tool according to claim 11, wherein:
each foot has an inner end that is partly circular when viewed in a cross-sectional plane perpendicular to the axis;
that inner end of each foot has a radius extending from a foot center point; and
while in the retracted position and in the gripping position, each foot center point is located on a line that extends through one of the cam surface center points, the line being parallel with the axis.

13. The tool according to claim 10, further comprising:
a central bore joining and extending from the central cavity in a direction away from the open end, the central bore having a cylindrical inner diameter; and wherein:
the retainer has a retainer body secured with an interference fit within the central bore.

14. The tool according to claim 10, wherein the retainer further comprises:
a retainer body;
a head connected to the retainer body by a neck, the neck having a smaller diametrical dimension than the head and the retainer body, defining opposed surfaces on the head and the retainer body that are in planes perpendicular to the axis; and wherein
the slot is defined by the neck and the opposed surfaces of the retainer body and the head.

15. The tool according to claim 10, further comprising a square drive socket formed in the tool body on an end of the tool body opposite the open end.

16. The tool according to claim 10, wherein an axial dimension of each foot is less than an axial dimension of each of the cam surfaces.

17. A tool for engaging drive flanks of a threaded nut, comprising:
a tool body having a central cavity with a longitudinal axis and an open upper end;
a plurality of cam surfaces formed in an inner wall of the central cavity and extending around the axis;
a central bore extending axially downward from a lower end of the central cavity;
a retainer body rigidly secured within the central bore;
a neck joining an upper end of the retainer body and protruding upward from the central bore into the central cavity;
a head having a larger diametrical dimension than the neck on an upper end of the neck, the head and the retainer body having opposing surfaces at upper and lower ends of the neck that define an annular slot around the neck;
a jaw for each of the cam surfaces, each of the jaws having an upper end at the upper end of the central cavity and a lower end recessed within the central cavity, each of the jaws having a curved outer side extending between the upper and lower ends of each of the jaws in flush contact with one of the cam surfaces, each of the jaws having on an inner side a drive surface extending between the upper and lower ends for engaging one of the drive flanks of the nut;

a foot extending inward from the lower end of each jaw into the slot, restricting upward movement of each of the jaws relative to the retainer; and wherein rotating the tool body relative to the jaws moves the drive surfaces of the jaws from a retracted position to a gripping position in engagement with the drive flanks of the nut.

18. The tool according to claim 17, wherein:

each foot has an inner end that is partly circular and convex when viewed in a cross-sectional plane perpendicular to the axis;

the inner end of each foot has a radius about a foot center point; and each foot rotationally pivots an increment while each of the jaws moves from the retracted position to the gripping position.

19. The tool according to claim 17, wherein when viewed in a cross-sectional plane through the feet perpendicular to the axis, each foot comprises:

two side edges extending from the outer side of each of the jaws inward toward the axis and converging toward each other;

an inner end that joins the side edges and is partly circular and convex; and a recess on each side edge between the inner end and the outer side of the jaw, the recess partly receiving the inner end of an adjacent one of the feet when the jaws are in the gripping position.

20. The tool according to claim 17, wherein:

each of the cam surfaces is curved with a radius extending from a single cam surface center point;

the inner end of each foot has a radius extending from a foot center point; and while in the retracted position and in the gripping position, each foot center point is located on a line that extends through one of the cam surface center points, the line being parallel with the axis.

\* \* \* \* \*